United States Patent [19]

Masuda et al.

[11] 4,380,568

[45] Apr. 19, 1983

[54] FLAME RETARDANT HEAT INSULATING COMPOSITION AND METHOD FOR PREPARING THE SAME

[75] Inventors: Shuji Masuda, Tokushima; Keisuke Ueno, Kawasaki, both of Japan

[73] Assignee: Chugai Boyeki Co., Ltd., Tokyo, Japan

[21] Appl. No.: 246,411

[22] Filed: Mar. 23, 1981

[51] Int. Cl.³ .............................................. B32B 7/00
[52] U.S. Cl. ............................ 428/276; 428/921; 428/537; 106/18.16
[58] Field of Search ............. 428/921, 702, 537, 403, 428/276, 279, 326; 106/18.16

[56] References Cited

U.S. PATENT DOCUMENTS 4,209,561  6/1980  Sawko .................................. 428/921
4,228,202  10/1980  Tjannberg ....................... 106/18.16

FOREIGN PATENT DOCUMENTS 989140  4/1965  United Kingdom ................ 428/276

*Primary Examiner*—George F. Lesmes
*Assistant Examiner*—Beverly K. Johnson

[57] ABSTRACT

Flame retardant heat insulating material and a method for preparing the same characterized in that a ground mixture of cellulose fibers with cellulose flakes or particles is chemically or physically bonded with condensed ammonium phosphate to form a fiberfil.

6 Claims, No Drawings

FLAME RETARDANT HEAT INSULATING COMPOSITION AND METHOD FOR PREPARING THE SAME

BACKGROUND OF THE INVENTION

The present invention relates to a novel flame retardant heat insulating composition and a method for preparing the same. More particularly, it relates to a fiberfil composition for a flame retardant heat insulating material of cellulosic fiberfil type which is useful in a flame retardant heat insulating mat, a flame retardant sound absorbing fiber and a flame retardant sound absorbing mat.

Since the oil crisis, energy and resources saving policyhas accelerated a general trend to improve the heat insulating property of buildings and houses, which in turn has led to various studies to improve the heat insulating property of materials, standardize steps for installing the insulation, and reduce the installation cost. It is particularly desired to improve the heat insulating property of glass wool and rock wool fiberfil mats used as conventional insulating materials, as well as to reduce the working costs and to improve workability by simplifying the steps for installing the insulation. In order to obviate these defects, it has been suggested to use a cellulose heat insulating fiberfil material of cellulose fibers, which is made of wood pulp and made flame retardant by treating it with borate or boric acid. The pulp has been conventionally used in the United States and Canada as an insulating material for buildings and houses. This flame retardant heat insulating material of cellulose fibers is injected or sprayed for insulation, and the installation and work efficiency are 5 to 10 times greater than the heat insulating glass wool and rock wool mats. The installation cost can also be reduced considerably. Moreover, the flame-retardant heat insulating material of cellulose fibers can be easily installed in buildings already existing as well as the buildings to be newly built; and the insulation can be extended to every and entire parts of a building, improving the insulating property greatly.

However, the flame retardant heat insulating material of cellulose fibers of the prior art has a disadvantage in that borate or boric is used in order to make the material flame retardant, and the content thereof is quite high at 15 to 25%. The inclusion of such chemicals renders the material to be highly water-absorbing. The material absorbs more moisture in the course of time to result in decreased bulk volume of the heat insulating fiber. The bulk of insulating material which has shrink on ageing on settling causes voids at various insulated parts of a house or building, and thus significantly decreases the heat insulating property. The hydroscopic nature of the insulating fiber itself impairs the insulating property of the material. In other words, the insulating material of cellulose fibers of the prior art is defective in that due to its moisture absorbing nature, the insulating property deteriorates not only as the material but also as the insulating material when installed.

SUMMARY OF THE INVENTION

The present inventors have made elaborate research and completed the present invention. We found that by mixing and grinding cellulose fibers with cellulose flakes or particles so as to physically decrease the density of the ground mixture, and by using condensed ammonium phosphate as an agent to increase the rigidity of the fibers and to give a flame retardant property to the fiberfil by adhesion to the molecules of cellulose in said ground mixture, a mixture of cellulose fibers can be obtained which is low in moisture absorption even at a higher humidity, maintains its rigidity and resilience and thus its apparent bulk volume even if it absorbed moisture.

The present invention therefore relates to a composition of flame retardant heat insulating material and a method for preparing the same characterized in that a ground mixture of cellulose fibers with cellulose flakes or particles is chemically or physically bonded with condensed ammonium phosphate into a fibrous cottony state.

DETAILED DESCRIPTION OF PREFERRED EMBODIMENT

More particularly, the present invention relates to a novel fibrous flame retardant heat insulating material of cellulose fibers which is obtained from a ground mixture of cellulose fibers with cellulose flakes or particles which is chemically or physically bonded into a fibrous cottony fiberfil with condensed ammonium phosphate. The cellulose fibers to be used in the present invention include at least one or more selected from the group of pulp, waste paper, spoiled paper, pulp sludge, linter, rice straws, bagass, etc. It may be used in any suitable form and used as cellulose fibers treating them with a chipper, a shredder, a refiner and the like depending on the form of the material.

Wood chips, wood meal, chaffs and the like may be used as the cellulose flakes or particles. Prior to mixing and grinding with the cellulose fibers, the flakes or particles are preferably treated by a grinder to form pillings. The cellulose fibers and the above mentioned cellulose pillings are mixed and ground. The heat insulating property is greatly dependent on the mixture ratio; it is preferable that the ratio of the cellulose fiber vs. cellulose pilling is in the range of 90:10–30:70 by weight in absolute dry state, and more preferably in the range of 80:20–50:50. When the ratio is in the above range, it permits uniform mixing and grinding, thus preventing blockings of the mixture. This produces insulating materials of a better applications, and prevents the cellulose fiberfil mixture from being compressed to a higher density during mixing and grinding thereby giving a uniform density in the final product. In other words, when cellulose fibers and cellulose pillings are mixed and ground in the ratio of from 90:10 to 30:70, the cellulose pillings may be uniformly incorporated into the intertwining cellulose fibers. This produces an insulating fiberfil material which has excellent apparent bulk volume and uniformly dispersed air voids, and which is thus elastic and resilient.

The present invention is further characterized in that condensed ammonium phosphate is contained in the composition in order to give rigidity to the cellulose fibers and flame retardant property to the composition as a whole, and to prevent deterioration of insulating property generally observed in the presently available commercial insulating materials of cellulose fibers arising from their moisture absorbing nature. Condensed ammonium phosphate is added to the composition, and subjected to thermal curing for causing said chemical to react with or adhere to the surface of the molecules and fibers of cellulose.

Condensed ammonium phosphate may be impregnated in the raw material prior to grinding, or may be added to the composition in a predetermined amount at a time of mixing and grinding. Ammonium phosphate is preferably condensed to a degree of 1 to 60, and more preferably 10 to 20. When the degree of condensation is in the above range, ammonium phosphate has a greater solubility in water, permitting it to be easily and uniformly impregnated in the cellulose fibers. The ground mixture which is uniformly impregnated with said chemical will show uniform flame retardance and heat insulating properties. The concentration of condensed ammonium phosphate solution is generally in the range of from 5 to 50% by weight, and preferably from 20 to 40% by weight. When the concentration is in the above ranges, it involves less time in impregnating and drying, and will help to avoid difficulty which may otherwise arise on account of a large amount of water. Moreover, it facilitates uniform dispersion of condensed ammonium phosphate and prevents the ground mixture from being finely pulverized. Condensed ammonium phosphate may be contained in the ground mixture in the range of about 5 to 20 parts by weight, and more preferably about 8 to 15 parts by weight, per every 100 parts by weight in dry state of the ground mixture. This produces a good flame retardant property in the cellulose mixture and a sufficient rigidity and thus resilience to the cellulose fibers; it thus prevents the ground mixture from losing its bulk volume, as it absorbs more moisture and from losing its heat insulating property due to an increase in the density. Moreover, there will be no increase in the overall moisture absorption in the ground mixture due to unreacted ammonium phosphate, and this prevents a decrease in the heat insulating property by the increase in thermal conductivity.

The water content of the cellulose flakes or particles at the time of grinding, and the water content at the time of grinding the same with the cellulose fibers are closely related with the efficiency in removing the heat generated by grinding, which causes thermal deterioration in the cellulose fibers, and in facilitating opening of the fibers by the swelling of the cellulose fibers. It is preferable to adjust the water content in the range of 30 to 60% by weight for such purposes, and water may be introduced into the raw materials in advance. Alternately, it may be added at the time of grinding or grinding and mixing. When the water content is in the above range, said grinding can be suitably carried out to prepare the desired cellulose fiber composition of a lower density. The ground mixture of cellulose fibers treated with condensed ammonium phosphate is subsequently subjected to drying and thermal curing in the drying process. It is preferable and economical to conduct drying and thermal curing in a shorter period of time at a higher temperature. Usually the ground mixture of cellulose fibers is thermally cured under the hot air in the range of from about 200° to 450° C., preferably between 250° and 400° C. for about 20 seconds to 10 minutes and more preferably for about 50 seconds to 7 minutes. Drying may be carried out in any conventional method, using any suitable heating devices such as a batch type heat circulator, tunnel type heat circulator, counter current convey type dryer, screw type heat conductive dryer, far-infra red radiation type dryer and the like.

As has been described above, the present invention provides a novel fiberfil material for flame retardant insulation and insulating materials made therefrom of cellulose fibers by reacting the ground mixture of cellulose fibers with condensed ammonium phosphate for chemical or physical bonding to give rigidity to the cellulose fibers. The ground fiberfil mixture thus treated according to the present invention is rendered less moisture absorbing, less liable to changes in the bulk density due to humidity, uniformly dispersed with lesser air voids caused by settling, and is flame retardant.

The flame retardant heat insulating fiberfil composition according to the present invention can be injected alone or sprayed together with a binder onto various parts of a house for insulating from heat and sound. It meets the requirements as a quasi-inflammable material for construction purposes.

The fiberfil composition in accordance with the present invention may also be formed into a felt by wet or dry methods; it may also be molded into a mat or bath using a needle punching machine or a carding machine and mixing with thermal plastic resin fibers or thermal hardening resin powder. The molded products have the same physical properties as those for the composition sprayed or injected for heat insulation.

The present invention will now be described in more detail by way of examples.

EXAMPLE 1

Cellulose fibers (pulp, pulp sludge, linter, rice straw or bagass) were mixed with cellulose flakes or particles (wood chips, wood meal) and ground in a disc type refiner (Disc Refiner 600 TA Type manufactured by Hasegawa Tekkosho K.K.) under the conditions given in Table 1. The flakes or particles had been ground in advance in a refiner of the same type.

An aqueous solution of condensed ammonium phosphate was added to the cellulose flakes or particles as they were mixed and ground with the cellulose fibers in all the examples except Tests No. 4 to No. 6, in which the solution was added during preliminary grinding of the flakes or particles. The degree of condensation of ammonium phosphate was 1 to 60.

The ground mixture was then subjected to drying and thermal curing in an air dryer (manufactured by Ohkawara Seisakusho K.K.).

The reaction conditions are given in Table 1 and the physical properties of the fiberfil product composition are shown in Table 2.

TABLE 1 (1)

| | Cellulose Flakes or Particles | | | | Cellulose Fibers | | Condensed Ammonium Phosphate | |
|---|---|---|---|---|---|---|---|---|
| | Raw Material | | Pre-refining | | Raw Material | | | |
| Test No. | Type | Wt. (Dry) (kg.) | Water Cont. (wt %) | Time (sec.) | Type | Wt. (Dry) (kg.) | Conc. (Wt %) | Amount of Addtn. (kg.) |
| 1 | wood meal | 5 | 40 | 10 | pulp | 95 | 50 | 40 |
| 2 | wood meal | 10 | 50 | 15 | " | 90 | 50 | 40 |
| 3 | wood | 20 | 50 | 25 | " | 80 | 5 | 100 |

TABLE 1 (1)-continued

| | Cellulose Flakes or Particles | | | | Cellulose Fibers | | Condensed Ammonium Phosphate | |
|---|---|---|---|---|---|---|---|---|
| | Raw Material | Pre-refining | | | Raw Material | | | |
| Test No. | Type | Wt. (Dry) (kg.) | Water Cont. (wt %) | Time (sec.) | Type | Wt. (Dry) (kg.) | Conc. (Wt %) | Amount of Addtn. (kg.) |
| 4 | wood meal | 50 | 40 | 70 | " | 50 | 50 | 10 |
| 5 | wood meal | 70 | 50 | 90 | " | 30 | 50 | 40 |
| 6 | wood meal | 80 | 50 | 120 | " | 20 | 50 | 30 |
| 7 | wood meal | 20 | 50 | 25 | " | 80 | 50 | 50 |
| 8 | wood chip | 20 | 50 | 25 | " | 80 | 40 | 20 |
| 9 | wood chip | 50 | 50 | 25 | " | 50 | 40 | 20 |
| 10 | wood meal | 20 | 50 | 25 | pulp sludge | 80 | 40 | 20 |
| 11 | wood meal | 50 | 50 | 25 | pulp sludge | 50 | 40 | 20 |
| 12 | wood meal | 20 | 50 | 25 | linter | 80 | 40 | 20 |
| 13 | wood meal | 50 | 50 | 25 | " | 50 | 40 | 20 |
| 14 | wood meal | 20 | 50 | 25 | rice straw | 80 | 40 | 20 |
| 15 | wood meal | 50 | 50 | 25 | rice straw | 50 | 40 | 20 |
| 16 | wood meal | 20 | 50 | 25 | bagass | 80 | 40 | 20 |
| 17 | wood meal | 50 | 50 | 25 | " | 50 | 40 | 20 |
| 18 | wood meal | 20 | 50 | 25 | pulp | 80 | 40 | 20 |

TABLE 1 (2)

| | Conditions for Mixing and Grinding | | | Dry and Heating | | | Ammonium phosphate |
|---|---|---|---|---|---|---|---|
| Test No. | Amount treated (Absolute dry weight (kg)) | Prescribed water cont. of mixture (%) | Time (sec.) | Temp. (°C.) | Time (min.) | Yield (%) | content in the product (wt %) |
| 1 | 120 | 50 | 260 | 200 | 6 | 98 | 20 |
| 2 | 120 | 50 | 260 | 200 | 6 | 97 | 20 |
| 3 | 105 | 55 | 240 | 450 | 5 | 98 | 5 |
| 4 | 105 | 40 | 240 | 250 | 5 | 98 | 5 |
| 5 | 120 | 50 | 270 | 450 | 6 | 98 | 20 |
| 6 | 115 | 50 | 250 | 300 | 6 | 97 | 15 |
| 7 | 125 | 40 | 280 | 250 | 7 | 98 | 25 |
| 8 | 108 | 40 | 250 | 250 | 6 | 98 | 8 |
| 9 | 108 | 40 | 250 | 250 | 6 | 98 | 8 |
| 10 | 108 | 40 | 250 | 250 | 6 | 98 | 8 |
| 11 | 108 | 40 | 250 | 250 | 6 | 97 | 8 |
| 12 | 108 | 40 | 250 | 250 | 6 | 98 | 8 |
| 13 | 108 | 40 | 250 | 250 | 6 | 98 | 8 |
| 14 | 108 | 40 | 250 | 250 | 6 | 97 | 8 |
| 15 | 108 | 40 | 250 | 250 | 6 | 97 | 8 |
| 16 | 108 | 40 | 250 | 250 | 6 | 98 | 8 |
| 17 | 108 | 40 | 250 | 250 | 6 | 98 | 8 |
| 18 | 108 | 40 | 250 | 180 | 20 | 98 | 8 |

TABLE 2

| | Physical Properties | | | |
|---|---|---|---|---|
| Test No. | Density (g/cm³) | Thermal Conductivity | Moisture Absorption (%) | Flame Retardant Property |
| 1. | 0.1241 | 0.071 | 7.11 | Class 2 |
| 2. | 0.0481 | 0.021 | 6.16 | " |
| 3. | 0.0326 | 0.020 | 5.96 | " |
| 4. | 0.0344 | 0.020 | 5.96 | " |
| 5. | 0.0496 | 0.021 | 6.27 | " |
| 6. | 0.2426 | 0.076 | 6.16 | " |
| 7. | 0.0526 | 0.066 | 10.26 | " |
| 8. | 0.0325 | 0.022 | 5.86 | " |
| 9. | 0.0344 | 0.023 | 5.73 | " |
| 10. | 0.0316 | 0.020 | 5.81 | " |
| 11. | 0.0338 | 0.021 | 5.74 | " |
| 12. | 0.0306 | 0.020 | 5.87 | " |
| 13. | 0.0321 | 0.021 | 5.64 | " |
| 14. | 0.0318 | 0.022 | 4.41 | " |
| 15. | 0.0337 | 0.022 | 4.26 | " |
| 16. | 0.0311 | 0.021 | 4.85 | " |

TABLE 2-continued

| Test No. | Density (g/cm³) | Thermal Conductivity | Moisture Absorption (%) | Flame Retardant Property |
|---|---|---|---|---|
| 17. | 0.0335 | 0.022 | 4.63 | " |
| 18. | 0.2016 | 0.098 | 17.14 | " |

*Thermal conductivity was measured at 20-21° C. using ATM-MDI gauge manufactered by Showa Denko K.K. Unit: Kcal/m hr °C.
*Moisture absorption was measured by the changes in the weight of the product which was left standing for 30 days in a thermo-hydrostat tank. Constant temperature: 25 ± 1° C., Constant humidity: 98 ± 1% R h
*Flame retardance was measured according to JISA-1321 (Flame Retardance Test for materials and processes for interior finish using a surface tester manufactured by Toyo Seiki K.K.

COMPARATIVE EXAMPLE 1

The physical properties of commercial glass wool, rock wool and flame retardant cellulose fibers were determined and shown in Table 3.

TABLE 3

| Products | Density (g/cm³) | Thermal Conductivity | Moisture Adsorption (%) | Flame Retardance |
|---|---|---|---|---|
| Glass Wool No. 1 | 0.0300 | 0.028 | 4.8 | Class 1-2 |
| Rock Wool No. 1 | 0.1100 | 0.038 | 6.7 | Class 1-2 |
| Flame Retardant Cellulose Fiber (borate treated | 0.0475 | 0.037 | 19.4 | Class 2 |

*Test method and conditions employed are the same as those for Example 1.

TEST 1

Thermal conductivity of the fiberfil insulating materials obtained in the examples and comparative example and the decrease in the bulk density thereof after moisture absorption as compared with the bulk density before moisture absorption were measured and the results are shown in Table 4.

TABLE 4

| Insulating Material | Thermal Conductivity | Decrease in Bulk Density V (%) |
|---|---|---|
| Test No. 2 | 0.027 | −0.07 |
| Test No. 4 | 0.026 | −0.05 |
| Test No. 5 | 0.027 | −0.04 |
| Glass Wool No. 1 | 0.035 | −0.05 |
| Rock Wool No. 1 | 0.052 | −0.06 |
| Cellulose Fibers (borate treated) | 0.085 | −13.46 |

What is claimed is:

1. A flame-retardant heat insulating composition essentially consisting of fibrous cellulose particles, wherein the ratio of cellulose fibers to cellulose particles is in the range of 90:10 to 30:70 by weight in the absolute dry state, bonded only with 5 to 20 wt percent of condensed phosphate as binder into fiberfil form.

2. The fiberfil composition according to claim 1, containing from 8 to 15 wt/% of said ammonium phosphate.

3. A method for preparing flame-retardant heat insulating cellulosic fiberfil material comprising the steps of grinding cellulosic fibers and cellulosic particles, adding and mixing thereto an aqueous solution of condensed ammonium phosphate, heating and curing the resulting mixture to dry and to bond it only by the condensed ammonium phosphate to fiberfil form, wherein the ratio of cellulose fibers to cellulose particles is in the range of 90:10 to 30:70 by weight in the absolute dry state and the solid content of the condensed ammonium phosphate is about 5 to 20 parts by weight per every 100 part by weight of the ground cellulose fiberfil.

4. The method according to claim 3 wherein the cellulosic particles are ground prior to mixing and grinding with the cellulosic fibers.

5. The method as claimed in claim 4 wherein the water content of the cellulosic particles at the time of grinding is from about 30 to 60 weight &.

6. The method as claimed in claim 1 wherein an aqueous solution of condensed ammonium phosphate with condensation of 1-60 is used at a concentration of about 5 to 50 weight %.

* * * * *